United States Patent
Wada

(10) Patent No.: US 7,076,368 B2
(45) Date of Patent: Jul. 11, 2006

(54) WEATHER PREDICTION SYSTEM AND POWER DEMAND PREDICTION SYSTEM, AND WEATHER PREDICTION METHOD AND POWER DEMAND PREDICTION METHOD

(75) Inventor: Masakazu Wada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 14 days.

(21) Appl. No.: 10/923,716

(22) Filed: Aug. 24, 2004

(65) Prior Publication Data

US 2005/0114028 A1    May 26, 2005

(30) Foreign Application Priority Data

Oct. 30, 2003   (JP)   ............................. 2003-370843

(51) Int. Cl.
*G01W 1/00*   (2006.01)

(52) U.S. Cl. ........................................................ 702/3

(58) Field of Classification Search ..................... 202/3
See application file for complete search history.

(56) References Cited

U.S. PATENT DOCUMENTS

2003/0083788 A1*   5/2003   Harada et al. .............. 700/291

FOREIGN PATENT DOCUMENTS

JP   2003-180032   6/2003

OTHER PUBLICATIONS

Meteorological Society of Japan, pp. 444-445, "Meteorological Science Encyclopedia" Jan. 25, 2001, Oct. 2, 1998.

* cited by examiner

*Primary Examiner*—Michael Nghiem
*Assistant Examiner*—Tung Lau
(74) *Attorney, Agent, or Firm*—Oblon, Spivak, McClelland, Maier & Neustadt, P.C.

(57) ABSTRACT

A weather prediction unit calculates a local numerical weather prediction model from GPV data and weather observation data and predicts a regional meteorological phenomenon in a fractionated region. A power demand prediction unit predicts a power demand in each region on the basis of the regional prediction result of the meteorological phenomenon. A generated heat value prediction unit predicts a generated heat value in each region on the basis of the regional prediction result of the power demand. The regional prediction result of the generated heat value is reflected on the numerical weather prediction model. Meteorological phenomena are predicted by adding the thermal energy as sensible heat from the earth's surface and taking artificial exhaust heat by electrical energy into consideration. Accordingly, weather prediction and power demand prediction are organically combined so that accurate weather prediction and power demand prediction are implemented while considering artificial heat exhaust.

4 Claims, 2 Drawing Sheets

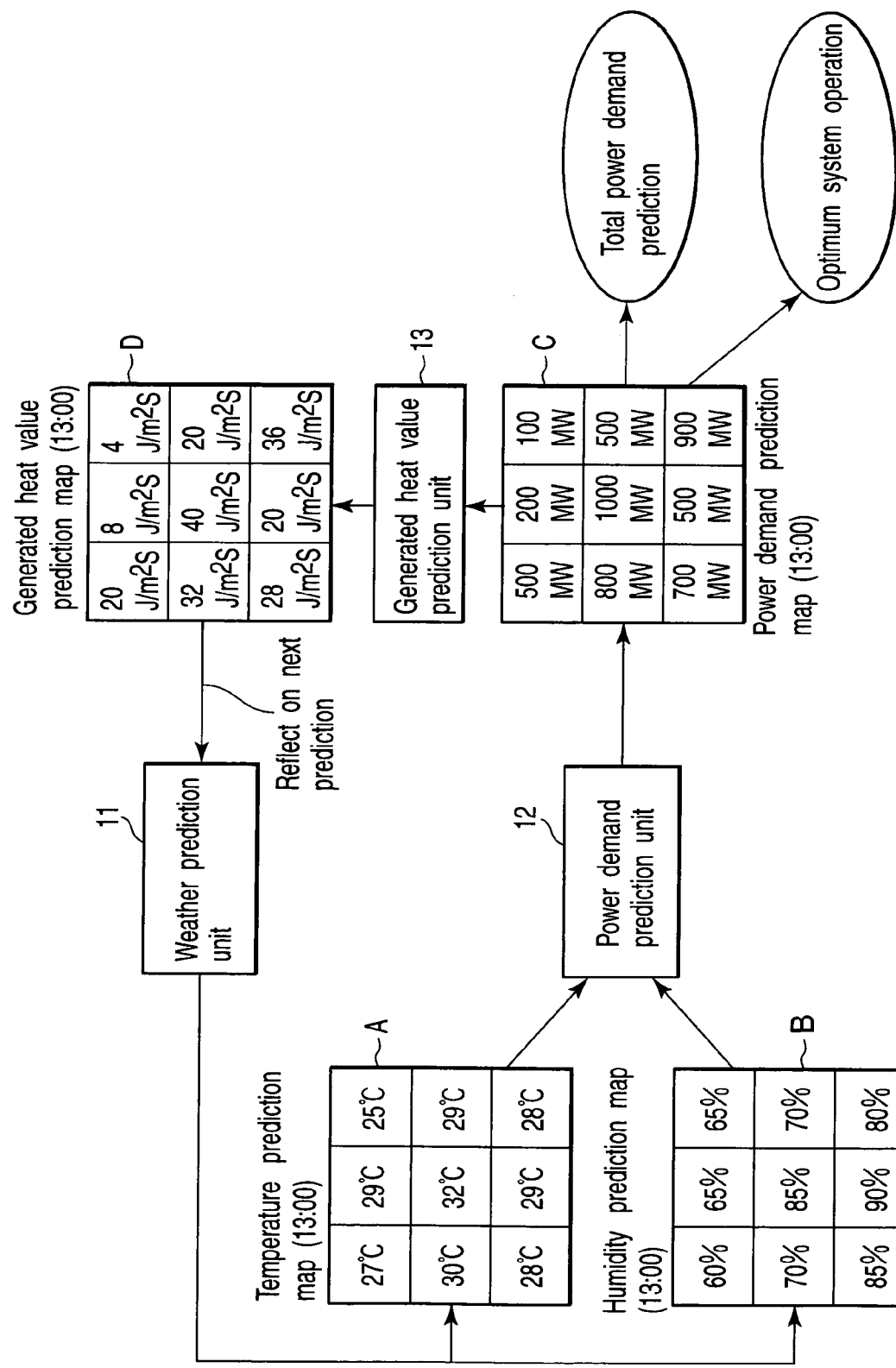
F I G. 2

WEATHER PREDICTION SYSTEM AND POWER DEMAND PREDICTION SYSTEM, AND WEATHER PREDICTION METHOD AND POWER DEMAND PREDICTION METHOD

CROSS-REFERENCE TO RELATED APPLICATIONS

This application is based upon and claims the benefit of priority from prior Japanese Patent Application No. 2003-370843, filed Oct. 30, 2003, the entire contents of which are incorporated herein by reference.

BACKGROUND OF THE INVENTION

1. Field of the Invention

The present invention relates to a weather prediction system and power demand prediction system, and a weather prediction method and power demand prediction method which predict a meteorological phenomenon and a power demand on the basis of the relationship between meteorological phenomena and power demands.

2. Description of the Related Art

Conventionally, prediction of meteorological phenomena is done independently of prediction of power demands. In recent years, atmospheric simulation software called a numerical weather prediction model. By using this software, meteorological phenomena are predicted several hours to about one week in the future. On the other hand, power demands show a strong correlation with atmospheric temperatures and humidities. For this reason, a power demand at its peak is predicted on the basis of the meteorological phenomenon prediction result (e.g., Jpn. Pat. Appln. KOKAI Publication No. 2003-180032).

When considering the relationship between meteorological phenomena and power demands, the heat-island phenomenon caused by rapid urbanization is nonnegligible. Major causes for the heat-island phenomenon are supposed to be the evaporation reduction effect (evaporation/transpiration decreases due to painting and the like, and cooling by heat of vaporization is suppressed) and artificial exhaust heat in the urban area ("Meteorological Science Encyclopedia", edited by Meteorological Society of Japan, Tokyo Shuppan, p. 445). Some numerical weather prediction models take the former evaporation reduction effect into consideration for calculation. However, no attempt has been made to estimate the latter artificial exhaust heat and reflect it on prediction of meteorological phenomena.

Actually, however, a cycle that raises the temperature is supposed to occur. That is, when the temperature rises, the power consumption by air conditioners increases. The exhaust heat from the air conditioners raises the temperature and further invokes the power demand. If this cycle is left out of consideration, an abrupt increase in temperature may be underestimated. An abrupt increase in temperature causes local severe rain at a high probability. Hence, the underestimation adversely affects prediction of local severe rain and makes it difficult to predict flood risk. It may also lead to degradation in prediction accuracy of the power demand which is calculated on the basis of meteorological phenomena.

BRIEF SUMMARY OF THE INVENTION

It is an object of the present invention to provide an accurate weather prediction system and power demand prediction system, and a weather prediction method and power demand prediction method, which organically combine weather prediction and power demand prediction while considering artificial heat exhaust, unlike systems or methods that predict the weather and power demand independently.

According to first aspect of the present invention, there is provided a weather prediction system which predicts a meteorological phenomenon in each of regions, which are obtained by fractionating a specific region in advance, on the basis of prediction information and observation information of a meteorological factor, which are periodically provided from an outside, comprising: meteorological phenomenon prediction means for predicting the meteorological phenomenon in each region by inputting the prediction information and observation information of the meteorological factor to a local numerical weather prediction model of the specific region; power demand prediction means for predicting a power demand in each region on the basis of the meteorological phenomenon predicted for each region; and generated heat value prediction means for predicting a generated heat value in each region on the basis of the power demand predicted for each region, wherein the meteorological phenomenon prediction means reflects the generated heat value predicted for each region on the numerical weather prediction model.

According to second aspect of the present invention, there is provided a power demand prediction system which predicts a power demand in each of regions which are obtained by fractionating a specific region in advance, comprising: meteorological phenomenon prediction means for predicting a meteorological phenomenon in each region by inputting prediction information and observation information of a meteorological factor, which are periodically provided from an outside, to a local numerical weather prediction model of the specific region; power demand prediction means for predicting a power demand in each region on the basis of the meteorological phenomenon predicted for each region; and generated heat value prediction means for predicting a generated heat value in each region on the basis of the power demand predicted for each region, wherein the meteorological phenomenon prediction means reflects the generated heat value predicted for each region on the numerical weather prediction model.

According to third aspect of the present invention, there is provided a weather prediction method of predicting a meteorological phenomenon in each of regions, which are obtained by fractionating a specific region in advance, on the basis of prediction information and observation information of a meteorological factor, which are periodically provided from an outside, comprising: predicting the meteorological phenomenon in each region by inputting the prediction information and observation information of the meteorological factor to a local numerical weather prediction model of the specific region; predicting a power demand in each region on the basis of the meteorological phenomenon predicted for each region; and predicting a generated heat value in each region on the basis of the power demand predicted for each region, wherein the generated heat value predicted for each region is reflected on the numerical weather prediction model.

According to fourth aspect of the present invention, there is provided a power demand prediction method of predicting a power demand in each of regions which are obtained by fractionating a specific region in advance, comprising: predicting a meteorological phenomenon in each region by inputting prediction information and observation information of a meteorological factor, which are periodically provided from an outside, to a local numerical weather prediction model of the specific region; predicting a power demand in each region on the basis of the meteorological phenomenon predicted for each region; and predicting a generated heat value in each region on the basis of the power demand predicted for each region, wherein the generated heat value predicted for each region is reflected on the numerical weather prediction model.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view showing examples of prediction maps generated by the respective prediction units in the system shown in FIG. 1.

DETAILED DESCRIPTION OF THE INVENTION

Figure 1:
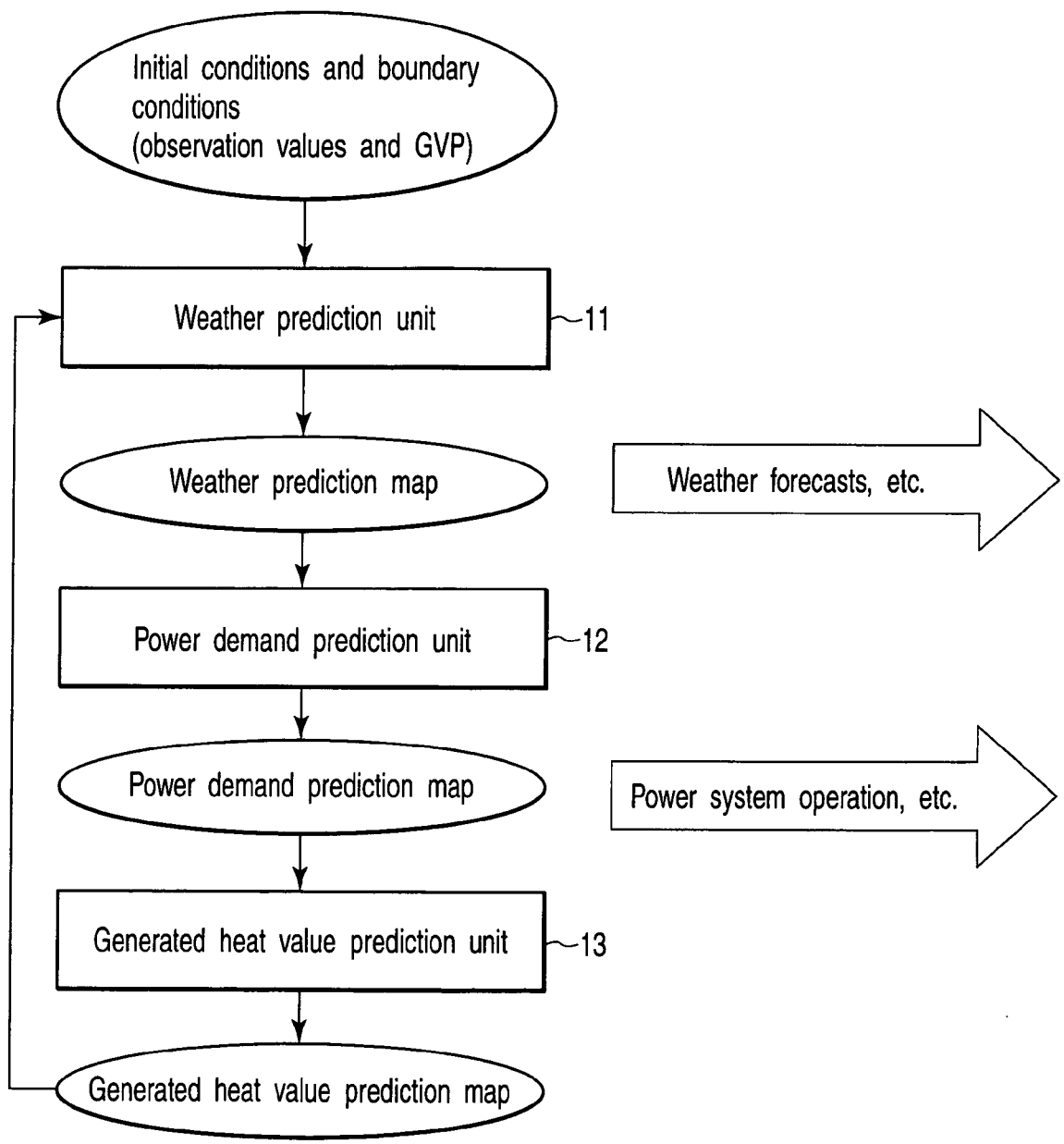
FIG. 1 is a block diagram showing a weather prediction/power demand prediction system according to an embodiment of the present invention.

The embodiment of the present invention will be described below in detail with reference to the accompanying drawing.

FIG. 1 is a block diagram showing a system configuration of the present invention. This system includes a weather prediction unit 11, power demand prediction unit 12, and generated heat value prediction unit 13. FIG. 2 shows examples of prediction maps (prediction time 13:00) generated by the prediction units 11 to 13.

The weather prediction unit 11 receives external meteorological information (i.e., initial conditions and boundary conditions) from meteorological agencies and similar agencies of the world. Each agency or organization provides the information. The external meteorological information consists of data items representing the meteorological factors predicted at grid points. The set of these data items is called GPV (Grid Point Value) data. The GPV data is produced based on GSM (Global Spectrum Model), RSM (Regional Spectrum Model), MSM (Mesoscale Spectrum Model), or ECMWF (European Centre for Medium-Range Weather Forecasts).

The weather prediction unit 11 receives internal meteorological information, too, at regular intervals. The internal meteorological information consists of data items acquired at weather radars, thermometers, hygrometers, ground rain gauges that are located at many places in the country. The unit 11 integrates the external meteorological information with the internal meteorological information, generating integrated meteorological information. A regional heat value predicted by the generated-heat-value predicting unit 13 is added to the integrated meteorological information, thus calculating a local numerical weather prediction model for a predetermined time. Grid point prediction data is generated, which represents the meteorological factors at grid intervals shorter than the grid intervals at which the GPV data (i.e., initial conditions and boundary conditions) is acquired. Thus, meteorological situation maps such as a temperature prediction map and a humidity prediction map including the temperature and humidity prediction results in each region are generated, as indicated by A and B in FIG. 2. The meteorological situation maps are mainly used for weather forecasts.

The power demand prediction unit 12 predicts the power demand in each region on the basis of the meteorological phenomenon prediction results such as the temperature prediction map and humidity prediction map obtained by the weather prediction unit 11 and generates a power demand prediction map as indicated by C in FIG. 2. The power demand prediction map is mainly used for power system operation.

The regionality of the power demand is put into a database on the basis of the past record. More specifically, the ratio of power demand in each region may be put into a database, or the relationship between the temperature, humidity, and power demand may be statistically obtained. Alternatively, the meteorological conditions and power demand may be made to correspond to each other in each region by the regression method in consideration of pieces of information such as the rainfall, wind direction, and wind velocity. In this case, the same system can be implemented even when a neural network or fuzzy clustering is used in place of the regression method. Power demand prediction has been described in detail in the above-described patent reference 1, and a description thereof will be omitted here.

The generated heat value prediction unit 13 predicts and calculates the heat value to be generated in each region on the basis of the regional power demand predicted by the power demand prediction unit 12 and generates a generated heat value prediction map as indicated by D in FIG. 2. The weather prediction unit 11 refers to the generated heat value prediction map and reflects it on the next prediction calculation.

The electrical energy is used for various application purposes. Although the electrical energy is temporarily converted into kinetic energy or some potential energy, most of the electrical energy finally becomes thermal energy. For example, approximately, assume that the total electrical energy is converted into thermal energy at an electricity supply time in an electricity supply area. In this case, thermal energy to be generated in an area can be calculated from the power demand in that area. The same calculation can be done by expressing the electrical energy to be supplied and the thermal energy to be generated by a predetermined function.

In the system configuration according to the present invention, in the numerical weather prediction model, meteorological phenomena are predicted by adding the thermal energy as sensible heat from the earth's surface and taking artificial exhaust heat by the electrical energy into consideration. On the basis of the thus obtained meteorological phenomenon prediction value, power demand in the future is predicted. Accordingly, realistic prediction is executed at a higher accuracy than independently predicting the meteorological phenomenon and power demand.

According to the weather/power demand prediction system of the present invention, the prediction accuracy of meteorological phenomena and, more particularly, the prediction accuracy of phenomena based on the heat-island phenomenon can be increased. This system can be used for various human activities such as disaster prevention or industries.

The prediction accuracy of power demand also increases. Hence, electric power companies can select the electric generator, adjust the generated power, select the power transmission path, and interchange the power on the basis of the predicted power demand in each region so that the power system can more stably and efficiently be operated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A weather prediction system which predicts a meteorological phenomenon in each of regions, which are obtained by fractionating a specific region in advance, on the basis of prediction information and observation information of a meteorological factor, which are periodically provided from an outside, comprising:
    meteorological phenomenon prediction means for predicting the meteorological phenomenon in each region by inputting the prediction information and observation information of the meteorological factor to a local numerical weather prediction model of the specific region;
    power demand prediction means for predicting a power demand in each region on the basis of the meteorological phenomenon predicted for each region; and
    generated heat value prediction means for predicting a generated heat value in each region on the basis of the power demand predicted for each region,
    wherein the meteorological phenomenon prediction means receives the generated heat value predicted for each region and adds the generated heat value predicted for each region to the input prediction information and observation information to thereby reflect the generated heat value predicted for each region on the numerical weather prediction model.

2. A power demand prediction system which predicts a power demand in each of regions which are obtained by fractionating a specific region in advance, comprising:
    meteorological phenomenon prediction means for predicting a meteorological phenomenon in each region by inputting prediction information and observation information of a meteorological factor, which are periodically provided from an outside, to a local numerical weather prediction model of the specific region;
    power demand prediction means for predicting a power demand in each region on the basis of the meteorological phenomenon predicted for each region; and
    generated heat value prediction means for predicting a generated heat value in each region on the basis of the power demand predicted for each region,
    wherein the meteorological phenomenon prediction means receives the generated heat value predicted for each region on the numerical weather prediction model and adds the generated heat value predicted for each region to the input prediction information and observation information to thereby reflect the generated heat value predicted for each region on the numerical weather prediction model.

3. A weather prediction method of predicting a meteorological phenomenon in each of regions, which are obtained by fractionating a specific region in advance, on the basis of prediction information and observation information of a meteorological factor, which are periodically provided from an outside, comprising:
    predicting the meteorological phenomenon in each region by inputting the prediction information and observation information of the meteorological factor to a local numerical weather prediction model of the specific region;
    predicting a power demand in each region on the basis of the meteorological phenomenon predicted for each region; and
    predicting a generated heat value in each region on the basis of the power demand predicted for each region,
    wherein the generated heat value predicted for each region is added to the input prediction information and observation information to thereby reflect the generated heat value predicted for each region on the numerical weather prediction model.

4. A power demand prediction method of predicting a power demand in each of regions which are obtained by fractionating a specific region in advance, comprising:
    predicting a meteorological phenomenon in each region by inputting prediction information and observation information of a meteorological factor, which are periodically provided from an outside, to a local numerical weather prediction model of the specific region;
    predicting a power demand in each region on the basis of the meteorological phenomenon predicted for each region; and
    predicting a generated heat value in each region on the basis of the power demand predicted for each region,
    wherein the generated heat value predicted for each region is added to the input prediction information and observation information to thereby reflect the generated heat value predicted for each region on the numerical weather prediction model.

* * * * *